April 6, 1954 A. W. WEST 2,674,658

RECEIVER LIFTER AND DIAL ACTUATOR

Filed May 9, 1951 3 Sheets-Sheet 1

Austin W. West
INVENTOR.

BY Clarence A. O'Brien
and Harvey B. Jacobson
Attorneys

April 6, 1954 A. W. WEST 2,674,658

RECEIVER LIFTER AND DIAL ACTUATOR

Filed May 9, 1951 3 Sheets-Sheet 2

Austin W. West
INVENTOR.

BY Clarence A. O'Brien
and Harvey B. Jacobson
Attorneys

RECEIVER LIFTER AND DIAL ACTUATOR

Filed May 9, 1951 3 Sheets-Sheet 3

Austin W. West
INVENTOR.

BY Clarence A. O'Brien
and Harvey B. Jacobson
Attorneys

Patented Apr. 6, 1954 2,674,658

UNITED STATES PATENT OFFICE 2,674,658

RECEIVER LIFTER AND DIAL ACTUATOR

Austin W. West, Dayton, Ohio

Application May 9, 1951, Serial No. 225,419

6 Claims. (Cl. 179—90)

This invention relates to new and useful improvements in electrical warning devices and the primary object of the present invention is to provide a device that is adapted to be electrically connected to a burglar alarm system for raising a telephone receiver and actuating a telephone dial.

Another important object of the present invention is to provide a warning device including a power driven shaft that will impart sliding movement to a member that will lift a receiver, and which shaft will also rotate a disk that is engaged with a dial to rotate and then release the dial.

A further object of the present invention is to provide a receiver lifter and dial actuator for telephones including novel and improved means disposed within a small and compact base or case for raising a telephone receiver and dialing a telephone to thereby inform an operator that trouble exists in the building structure in which the device is installed.

A still further aim of the present invention is to provide a device of the aforementioned character that is simple and practical in construction, strong and reliable in use, small and compact in structure, neat and attractive in appearance, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
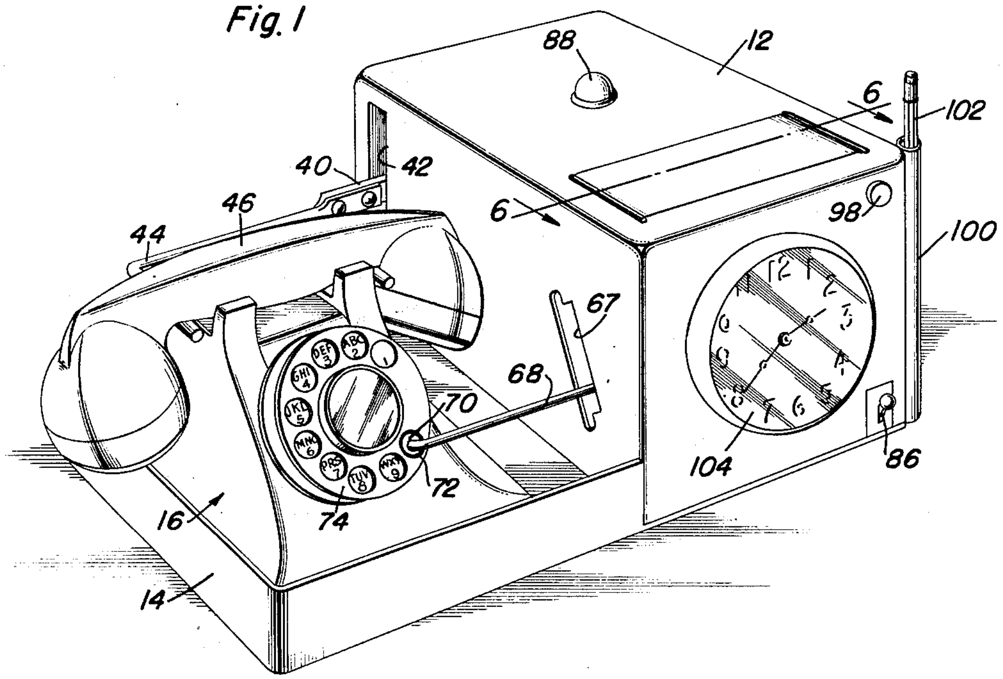
Figure 1 is a perspective view of the present invention engaged with a telephone.
Figure 6:
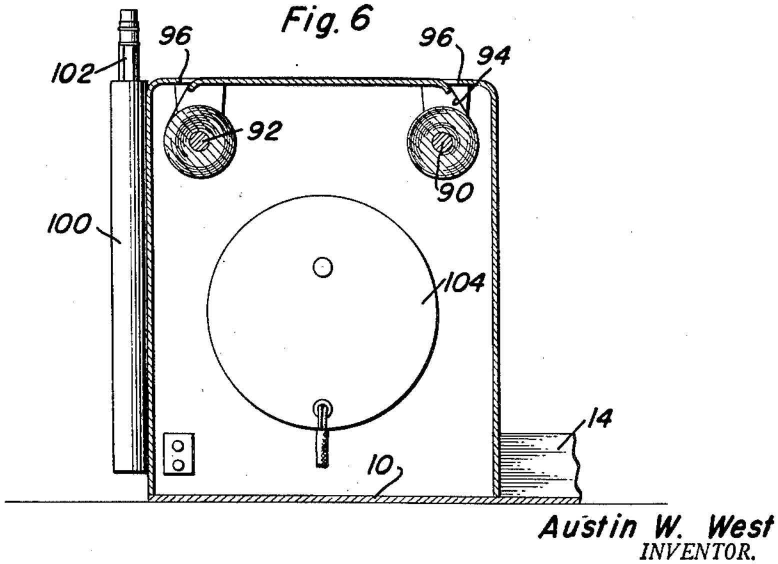
Figure 6 is a fragmentary longitudinal vertical sectional view taken substantially on the plane of section line 6—6 of Figure 1.
Figure 2:
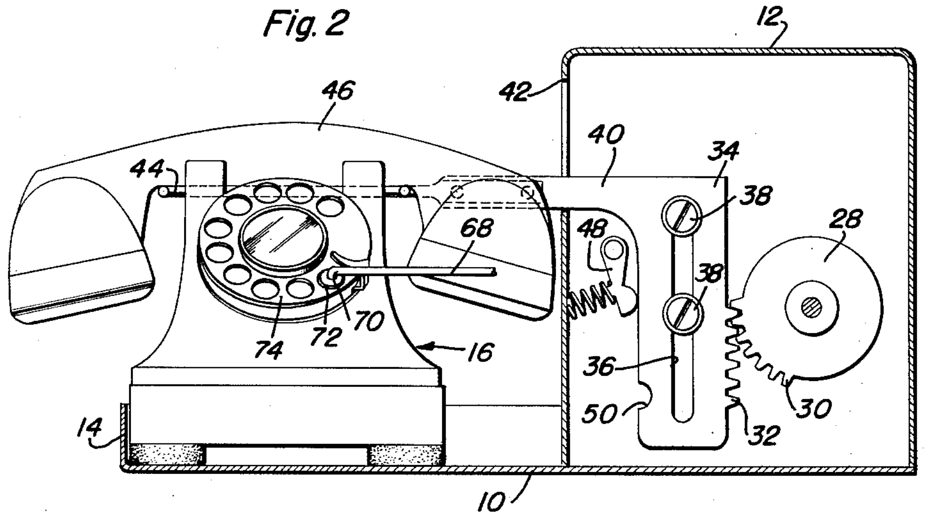
Figure 2 is a vertical sectional view taken on the plane of section line 2—2 of Figure 3.
Figure 3:
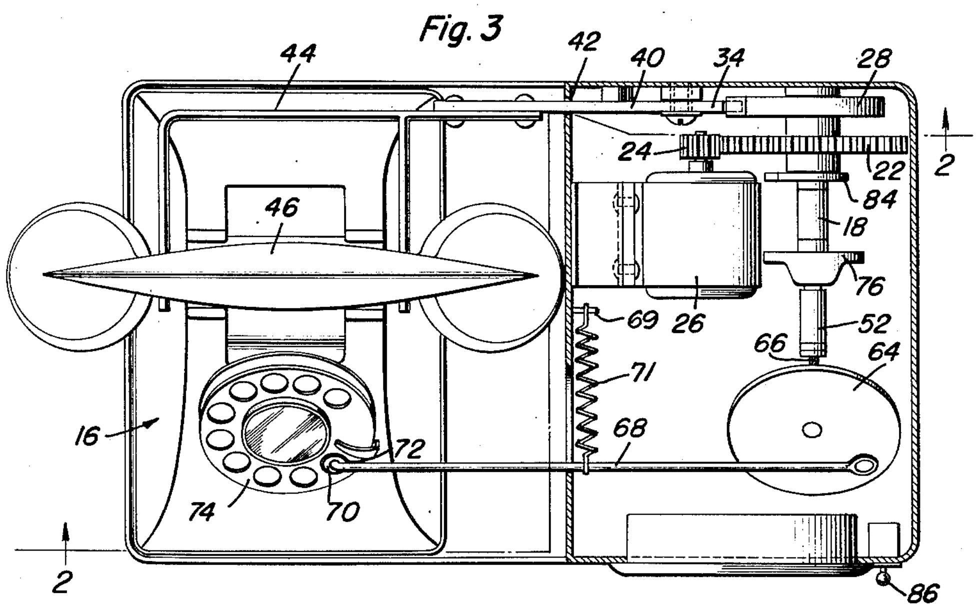
Figure 3 is a horizontal sectional view of Figure 1.
Figure 4:
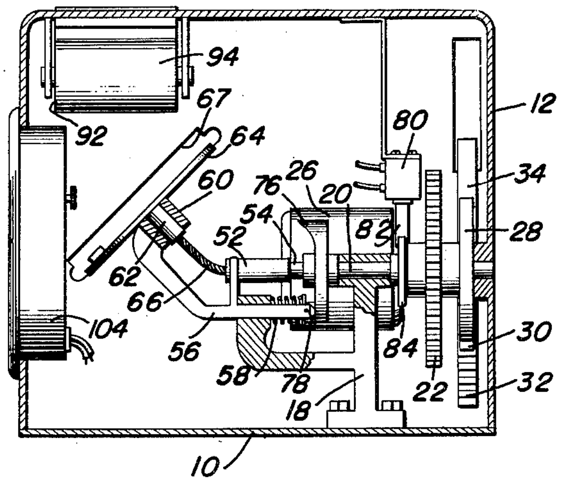
Figure 4 is a transverse vertical sectional view of Figure 3 and with parts broken away for convenience of explanation.

Referring now to the drawings in detail, wherein for the purpose of illustration, there is disclosed a preferred embodiment of the present invention, the numeral 10 represents an elongated base having a hollow removable cover 12 at one end and an upstanding flange 14 at its other end that will surround the base of a telephone 16 resting on the base adjacent the cover 12.

A frame 18 is supported on the base and under the cover 12. The frame 18 rotatably supports a horizontal shaft 20 on which there is mounted a gear 22 that engages another gear 24 on the drive shaft of an electric motor 26 mounted in the cover 12. The shaft 20 carries a circular plate 28 having a toothed portion 30 that meshes with the vertically toothed portion 32 of a vertically slidable member 34.

The member 34 is formed with a vertical slot 36 that slidably receives a pair of guides 38 attached to and located within the cover 12. The member 34 includes a portion 40 that is slidably received in a vertical slot 42 in the cover 12 and which supports a horizontal yoke 44 that underlies the receiver 46 of the telephone 16.

A spring urged pawl 48 is pivoted for vertical swinging movement in the cover 12 for entering a recess 50 in the member 34 after the member 34 has been moved upwardly sufficiently to raise the receiver 46 from its normal position.

An internally splined collar 52 is slidably mounted on the shaft 20 and its internal splines (not shown) are adapted to selectively engage and disengage the external splines 54 on one end of the shaft 20. The collar 52 is rotatably attached to a support 56 that is slidably carried by the frame 18 and a spring 58 acts on the support 56 and urges the collar 52 to a position where its internal splines engage the splines 54 so that the collar 52 will rotate with the shaft 20.

The support 56 is formed with a vertically inclined bearing 60 that rotatably supports a stub axle 62 fixed to the center of a disk 64. A flexible shaft 66 is terminally fixed to the collar 52 and the axle 60 to permit rotation of the disk 64 with the collar 52. The cover 12 is formed with a guide slot 67 that slidably receives an arm 68 eccentrically pivoted to the disk 64 at one end. The other end of the arm 68 carries a laterally projecting finger 70 that enters the last finger opening 72 in the dial 74 of the telephone 16. The dial plate 74 is coplanar with the disk 64 so that the dial plate will rotate as the disk 64 is rotated and the arm 68 reciprocated.

The wall of the housing 12 is provided with an inwardly extending projection 69 which is secured above the upper end of the slot 67. A coil spring 71 is secured at one end to the projection 69 and the other end of the coil spring 71 slidably engages the rod 68 for urging the rod 68 upwardly. The spring 71 will overcome the tendency of the dial spring to return the dial to starting position when the rod 68 is in dead center position.

A cam 76 is mounted on the shaft 20 for rotation therewith and will engage an end 78 of the support 56 to impart sliding movement to the support 56 sufficient to disengage the finger 70 from opening 72 after the dial plate 74 has been rotated to dial the operator.

The motor 26 is electrically connected to a source of electric current and to a switch 80, the latter being mounted in the cover 12. The switch 80 includes a tumbler button 82 that will be actuated by a cam 84 on the shaft 20 as the shaft 20 rotates in order to break the circuit to the motor 26.

An additional switch 86 is mounted on the cover 12 and this switch is electrically connected to the circuit of the motor and to a lamp 88 supported on the cover 12 to indicate that the invention is in proper condition for operation.

A pair of rollers 90 and 92 are supported for rotation on brackets attached to and located within the cover 12. A roll of paper 94 is terminally attached to and wound on the rollers and the paper extends over the upper wall of the cover 12 and through a pair of parallel slots 96 in the upper wall of the cover. The roller 92 is provided with an exposed finger knob 98 whereby the paper may be unwound from one roller and wound on the other roller.

A sleeve 100 attached to the cover 12 removably supports a scriber 102 that may be manually employed for writing upon the portion of paper 94 overlying the cover 12.

The forward wall of cover 12 is formed with an opening in which there is mounted an electric clock 104 that is electrically connected to the circuit of the motor.

Figure 5:
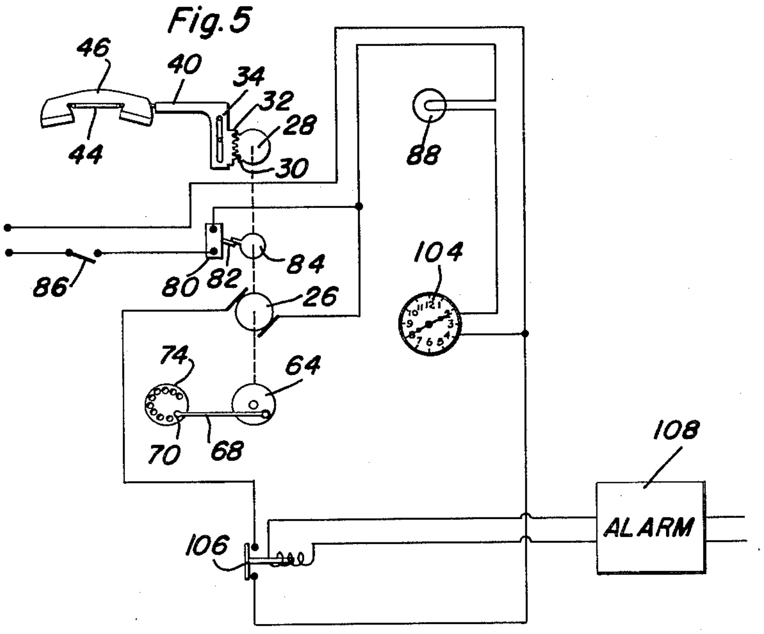
Figure 5 is a diagrammatic view of the electrical system used in the present invention.

In practical use of the present invention, the circuit of the motor, as shown in Figure 5, is broken to accommodate a switch 106 that is connected to a suitable electric alarm 108 of a window, door or the like.

As the alarm 108 is actuated, the switch 106 is moved to its circuit closing position to complete the circuit to the motor 26 whereupon the shaft 20 will rotate to effect a raising of the member 34 and the receiver 46.

A moment later the disk 64 will be rotated, through the medium of collar 52, splines 54 and shaft 66, to effect a movement of the arm 68 which will cause the dial plate 74 to rotate to dial the operator. After the dial plate has been rotated clockwise, the cam 76 will engage end 78 to slide the support and permit the finger 70 to move out of the opening 72 whereupon the dial plate will be released to return to its normal position completing the dial to the operator.

Obviously, the user of the device may have previously arranged with the telephone company to notify the police force in the event the operator is called without oral discussion, whereupon the operator will immediately inform the police force that a call has been made.

The present invention is adaptable for various types of phones and the dialing arm and finger are removed when used with a phone without a dial. For use with an upright phone, with a dial, the lifter arm is replaced by an upright and fingers to reach the receiver. The device may also be connected with fire alarm attachments so that an operator will be dialed in case of fire.

Having described the invention, what is claimed as new is:

1. Receiver lifter and dial actuator for telephones comprising a base, a vertically slidable lifter member carried by the base, means operatively connected to the lifter member for imparting vertical sliding movement to the latter, means for engaging and retaining the lifter in a raised position, said first named means including a power driven shaft, a collar slidably mounted on said shaft and having internal splines, said shaft having external splines for engaging said internal splines to permit rotation of said collar with said shaft, a rotatable disk connected to said collar for rotation therewith and for sliding movement with the collar, a dial actuator eccentrically pivoted to said disk and having a portion adapted to enter a finger opening in a telephone dial, and means carried by said shaft for moving the internal splines of the collar out of engagement with the external splines of the shaft.

2. Receiver lifter and dial actuator for telephones comprising a base, a vertically slidable lifter member carried by the base, means operatively connected to the lifter member for imparting vertical sliding movement to the latter, means for engaging and retaining the lifter in a raised position, said first named means including a power driven shaft, a collar slidably mounted on said shaft and having internal splines, said shaft having external splines for engaging said internal splines to permit rotation of said collar with said shaft, a rotatable disk connected to said collar for rotation therewith, a dial actuator eccentrically pivoted to said disk and having a portion adapted to enter a finger opening in a telephone dial, a slidable holder attached to the collar and rotatably supporting the disk, and a cam mounted on the shaft for engaging and imparting sliding movement to the holder sufficient to move the internal splines out of engagement with the external splines whereby the said portion of said actuator will release a dial engaged thereby.

3. Receiver lifter and dial actuator for telephones comprising a base, a vertically slidable member carried by the base for raising a telephone, a power driven shaft, means mounted on said shaft engaging the member to raise the latter, a frame mounted on the base and rotatably supporting the shaft, said shaft including external splines, an internally splined collar slidably mounted on the shaft for selectively engaging and disengaging said external splines, a support slidably mounted on said frame and attached to said collar, a disk rotatably supported on the support and connected to the collar for rotation therewith, a dial actuator eccentrically pivoted to the disk and having a portion for entering a finger opening in a telephone dial, and means on said shaft for engaging the support to impart sliding movement to the support sufficiently to permit said portion to disengage a dial.

4. Receiver lifter and dial actuator for telephones comprising a base, a vertically slidable member carried by the base for raising a telephone, a power driven shaft, means mounted on said shaft engaging the member to raise the latter, a frame mounted on the base and rotatably supporting the shaft, said shaft including external splines, an internally splined collar slidably mounted on the shaft for selectively engaging and disengaging said external splines, a support slidably mounted on said frame and attached to said collar, a disk, a stub axle secured to the center of said disk, said support including a vertically inclined bearing rotatably supporting the axle, a flexible shaft connecting the axle to the collar for rotation of the disk with the collar, an arm eccentrically pivoted to the disk and having a portion adapted to enter a finger opening in a telephone dial, and means on said shaft for engaging the support to impart sliding movement to the support sufficiently to permit said portion to disengage a dial.

5. Receiver lifter and dial actuator for telephones comprising a base, an electric motor mounted on the base, a shaft driven by the motor, a vertically slidable receiver lifter carried by the base, means mounted on the shaft for engaging the lifter to raise the latter, a frame mounted on the base and rotatably supporting the shaft, said shaft having external splines, a collar slidable on the shaft and including internal splines for selectively engaging and disengaging the external splines, a support slidably carried by the frame and attached to the collar, a disk rotatably supported on the support and connected to the collar for rotation therewith, an arm eccentrically pivoted to said disk and having a portion adapted to enter a finger opening in a telephone dial, means mounted on the shaft for engaging the support to slide the internal splines of the collar out of engagement with the external splines of the shaft, a switch connected to the motor, and means on the shaft for actuating the switch.

6. For use with a telephone, a base supporting the telephone and including a hollow end portion, a vertically slidable member carried by said end portion and including a horizontal yoke extending under the receiver of the telephone, a frame mounted in the end portion, a shaft rotatably supported by the frame, an electric motor connected to the shaft for rotating the latter, means mounted on the shaft for engaging and lifting the member, a support slidably carried by the frame, a collar slidably mounted on the shaft and having internal splines, said shaft including external splines for engaging said internal splines, said collar being attached to said support, a disk rotatably mounted on said support and disposed coplanar with the dial of the telephone, an arm eccentrically pivoted to the disk and having a portion engaging a finger opening in the dial of the telephone, a switch connected to the motor, means on the shaft for engaging the switch to deactivate the latter during rotation of the shaft, and means on the shaft for engaging the support to slide the support and move the portion of said arm out of the finger opening.

References Cited in the file of this patent

UNITED STATES PATENTS

| Number | Name | Date |
|---|---|---|
| 1,206,531 | Gosline | Nov. 28, 1916 |
| 1,870,547 | Wise | Aug. 9, 1932 |
| 1,882,106 | Wise | Oct. 11, 1932 |
| 2,335,039 | Bright | Nov. 23, 1943 |